United States Patent
Barke et al.

(10) Patent No.: US 11,513,773 B2
(45) Date of Patent: Nov. 29, 2022

(54) FEEDBACK-DRIVEN SEMI-SUPERVISED SYNTHESIS OF PROGRAM TRANSFORMATIONS

(71) Applicant: MICROSOFT TECHNOLOGY LICENSING, LLC., Redmond, WA (US)

(72) Inventors: Shraddha Govind Barke, San Diego, CA (US); Xiang Gao, Singapore (SG); Sumit Gulwani, Sammamish, WA (US); Alan Thomas Leung, Kirkland, WA (US); Nachiappan Nagappan, Bellevue, WA (US); Arjun Radhakrishna, Seattle, WA (US); Gustavo Araujo Soares, Seattle, WA (US); Ashish Tiwari, Sammamish, WA (US); Mark Alistair Wilson-Thomas, Mercer Island, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 121 days.

(21) Appl. No.: 17/038,427

(22) Filed: Sep. 30, 2020

(65) Prior Publication Data
US 2022/0012020 A1 Jan. 13, 2022

Related U.S. Application Data

(60) Provisional application No. 63/050,025, filed on Jul. 9, 2020.

(51) Int. Cl.
*G06F 8/33* (2018.01)
*G06N 20/00* (2019.01)

(52) U.S. Cl.
CPC .............. *G06F 8/33* (2013.01); *G06N 20/00* (2019.01)

(58) Field of Classification Search
None
See application file for complete search history.

(56) References Cited

U.S. PATENT DOCUMENTS 1,120,144 A * 12/1914 Hine ...................... F16K 31/46
220/3.7
10,466,978 B1 * 11/2019 Vidan ..................... G06N 7/005
(Continued)

OTHER PUBLICATIONS

Rolim et al., "Learning Syntactic Program Transformations from Examples," IEEE, 2017, 12 pg. (Year: 2017).*
(Continued)

*Primary Examiner* — Ryan D. Coyer

(57) ABSTRACT

A synthesis procedure learns program transformations for a text document, on-the-fly during an edit session, from examples of concrete edits made during the edit session and from an unsupervised set of additional inputs. The additional inputs are derived from explicit feedback from the user and inferred feedback from the user's behavior during the edit session. A reward score, based on anti-unification and provenance analysis, is used to classify the additional inputs as either a positive input or a negative input. Outputs are generated for the positive inputs that are consistent with the existing examples and then used to synthesize a new program transformation. The program transformations are then used to generate code edit suggestions during the edit session.

19 Claims, 9 Drawing Sheets

(56) References Cited

U.S. PATENT DOCUMENTS

| | | | |
|---|---|---|---|
| 10,474,961 B2* | 11/2019 | Brigham | G06N 20/00 |
| 10,671,355 B2 | 6/2020 | Banuelos et al. | |
| 2010/0083225 A1 | 4/2010 | Giat et al. | |
| 2013/0263086 A1 | 10/2013 | Carter et al. | |
| 2015/0089297 A1 | 3/2015 | Johnson et al. | |
| 2015/0135166 A1* | 5/2015 | Tarlow | G06F 11/3604 |
| | | | 717/124 |
| 2016/0103662 A1 | 4/2016 | Di Balsamo et al. | |
| 2018/0018167 A1* | 1/2018 | Hua | G06F 8/74 |
| 2018/0174684 A1* | 6/2018 | Eastman | G06N 20/00 |
| 2019/0317760 A1 | 10/2019 | Kessentini et al. | |
| 2019/0324727 A1* | 10/2019 | Carranza | G06F 11/3604 |
| 2019/0324744 A1* | 10/2019 | Alam | G06F 16/906 |
| 2020/0133662 A1* | 4/2020 | Smith | G06F 9/54 |
| 2020/0150953 A1 | 5/2020 | Smith et al. | |
| 2020/0159643 A1* | 5/2020 | Wang | G06F 11/3616 |
| 2021/0303271 A1* | 9/2021 | Hicklin | G06F 8/33 |

OTHER PUBLICATIONS

Awad, et al., "Efficient Learning Machines: Theories, Concepts, and Applications for Engineers and System Designers", In Book of Efficient Learning Machines: Theories, Concepts, and Applications for Engineers and System Designers, Apress; 1st Ed. Edition, Apr. 30, 2015, 263 Pages.

"International Search Report and Written Opinion Issued in PCT Application No. PCT/US21/029036", dated Jul. 30, 2021, 15 Pages.

Yu, et al., "Learning the Relation Between Code Features and Code Transforms with Structured", In Repository of arXiv: 1907.09282, Jul. 22, 2019, 27 Pages.

Zhu, Xiaojin, "Semi-Supervised Learning Literature Survey", In Technical Report, University of Wisconsin-Madison Department of Computer Sciences, Sep. 2005, 39 Pages.

Vakilian, et al., "Use, Disuse, and Misuse of Automated Refactorings", In Proceedings of the 34th International Conference on Software Engineering, Jun. 2, 2012, pp. 233-243.

Zhang, et al., "Bing Developer Assistant: Improving Developer Productivity by Recommending Sample Code", In Proceedings of the 24th ACM SIGSOFT International Symposium on Foundations of Software Engineering, Nov. 13, 2016, pp. 956-961.

Yessenov, et al., "Data-Driven Synthesis for Object-Oriented Frameworks", In ACM SIGPLAN Notices, vol. 46, Issue 10, Oct. 22, 2011, pp. 65-81.

An, et al., "Augmented Example-Based Synthesis using Relational Perturbation Properties", In Proceedings of the ACM on Programming Languages, vol. 4, Jan. 2020, 24 Pages.

Bader, et al., "Getafix: Learning to Fix Bugs Automatically", In Proceedings of the ACM on Programming Languages, Oct. 2019, 27 Pages.

Bessey, et al., "A Few Billion Lines of Code Later: Using Static Analysis to Find Bugs in the Real World", In Journal of Communications of the ACM, vol. 53, Issue 2, Feb. 2010, pp. 66-75.

Bruch, et al., "Learning from Examples to Improve Code Completion Systems", In Proceedings of the 7th Joint Meeting of the European Software Engineering Conference and the ACM SIGSOFT International Symposium on Foundations of Software Engineering, Aug. 23, 2009, 11 Pages.

Das, et al., "Contextual Code Completion Using Machine Learning", In Technical Report of Stanford University, 2015, 6 Pages.

Evans, et al., "Clone Detection via Structural Abstraction", In Software Quality Journal, vol. 17, Issue 4, Dec. 1, 2009, 10 Pages.

Gulwani, Sumit, "Automating String Processing in Spreadsheets Using Input Output Examples", In Proceedings of the 38th Annual ACM SIGPLAN-SIGACT Symposium on Principles of Programming Languages, Jan. 26, 2011, pp. 317-329.

Gvero, et al., "Complete Completion using Types and Weights", In Proceedings of the 34th ACM SIGPLAn Conference on Programming Language Design and Implementation, Jun. 16, 2013, pp. 27-38.

Jha, et al., "Oracle-Guided Component-Based Program Synthesis", In Proceedings of the ACM/EEE 32nd International Conference on Software Engineering, May 2, 2010, pp. 215-224.

Jiang, et al., "Deckard: Scalable and Accurate Tree-Based Detection of Code Clones", In Proceedings of 29th International Conference on Software Engineering, May 20, 2007, 11 Pages.

Kim, et al., "A Field Study of Refactoring Challenges and Benefits", In Proceedings of the ACM SIGSOFT 20th International Symposium on the Foundations of Software Engineering, Nov. 11, 2012, 11 Pages.

Le, et al., "Interactive Program Synthesis", In Journal of Computing Research Repository, Mar. 10, 2017, 13 Pages.

Mayer, et al., "User Interaction Models for Disambiguation in Programming by Example", In Proceedings of the 28th Annual ACM Symposium on User Interface Software & Technology, Nov. 8, 2015, pp. 291-301.

Meng, el al., "LASE: Locating and Applying Systematic Edits by Learning from Examples", In Proceedings of the 35th International Conference on Software Engineering, May 18, 2013, 10 Pages.

Meng, et al., "Systematic Editing: Generating Program Transformations from an Example", In Journal of ACM SIGPLAN Notices, vol. 46, Issue 6, Jun. 4, 2011. pp. 329-342.

Mens, et al., "A Survey of Software Refactoring", In Journal of IEEE Transactions on Software Engineering, vol. 30, Issue 2, Feb. 2004, 14 Pages.

Miltner, et al., "On the Fly Synthesis of Edit Suggestions", In Proceedings of the ACM on Programming Languages, vol. 3, Oct. 10, 2019, 29 Pages.

Murphy-Hill, et al., "Improving Software Developers' Fluency by Recommending Development Environment Commands", In Proceedings of the ACM SIGSOFT 20th International Symposium on the Foundations of Software Engineering, Nov. 11, 2012, 11 Pages.

Nguyen, et al., "A Study of Repetitiveness of Code Changes in Software Evolution", In Proceedings of the 28th IEEE/ACM International Conference on Automated Software Engineering, Nov. 11, 2013, 13 Pages.

Opdyke, William F., "Refactoring Object-Oriented Frameworks", In Thesis of University of Illinois, Jul. 1992, 152 Pages.

Perelman, et al., "Type-Directed Completion of Partial Expressions", In Proceedings of the 33rd ACM SIGPLAN Conference on Programming Language Design and Implementation, Jun. 11, 2012, pp. 275-286.

Polozov, et al., "FlashMeta: A Framework for Inductive Program Synthesis", In Proceedings of the ACM SIGPLAN International Conference on Object-Oriented Programming, Systems, Languages, and Applications, Oct. 25, 2015, pp. 107-126.

Raychev, et al., "Code Completion with Statistical Language Models", In Proceedings of the 35th ACM SIGPLAN Conference on Programming Language Design and Implementation, Jun. 9, 2014, pp. 419-428.

Rolim, et al., "Learning Quick Fixes from Code Repositories", In Journal of Computing Research Repository, Mar. 2018, 12 Pages.

Rolim, et al., "Learning Syntactic Program Transformations from Examples", In Proceedings of the 39th International Conference on Software Engineering, May 20, 2017, 12 Pages.

Singh, Rishabh, "BlinkFill: Semi-Supervised Programming by Example for Syntactic String Transformations", In Proceedings of the VLDB Endowment, vol. 9, Issue 10, Jun. 2016, pp. 8161-8827.

Steimann, et al., "Refactorings without Names", In Proceedings of the 27th IEEE/ACM International Conference on Automated Software Engineering, Sep. 3, 2012, pp. 290-293.

Zhu, et al., "Introduction to Semi-Supervised Learning", In Synthesis Lectures on Artificial Intelligence and Machine Learning, vol. 3, Issue 1, Jun. 2009, 1 Page.

"Visual Studio", Retrieved from: https://web.archive.org/web/20200729084517/https:/visualstudio.microsoft.com/, Jul. 29, 2020, 4 Pages.

"The Community for Open Innovation and Collaboration", Retrieved from: https://web.archive.org/web/20200728162226/https:/www.eclipse.org/, Jul. 28, 2020, 4 Pages.

"ReSharper", Retrieved from: https://web.archive.org/web/20200725234249/https:/www.jetbrains.com/resharper/, Jul. 25, 2020, 8 Pages.

(56) References Cited

OTHER PUBLICATIONS

"IntelliJ IDEA", Retrieved from: https://web.archive.org/web/20200722230245/https://www.jetbrains.com/idea/, July 22, 2020, 7 Pages.

* cited by examiner

FEEDBACK-DRIVEN SEMI-SUPERVISED SYNTHESIS OF PROGRAM TRANSFORMATIONS

CROSS-REFERENCE TO RELATED APPLICATIONS

The present application claims the benefit of the earlier filed provisional application having Ser. No. 63/050,025 filed on Jul. 9, 2020, which is incorporated by reference herein in its entirety.

BACKGROUND

Editing source code programs is a task that is performed often during the development and maintenance of a source code program. Developers (e.g., users, programmers) often perform repetitive edits to a program to add new features, repair bugs, or refactor portions of the source code. These repetitive edits are context-specific and can be applied to multiple locations in the source code program having a similar context. Performing these edits manually is tedious and error-prone. To reduce the developer's burden in performing these edits, software tools, such as Integrated Development Environments (IDEs) and static analysis tools, implement transformations for some fixed class of repetitive edits that are frequently encountered, through boilerplate code (e.g., equality comparisons or constructors), code refactoring (e.g., Rename, Extract Method), and quick fixes. However, these transformations are limited and extending them is complicated and time-consuming.

Programming by example is another technique used in some software tools that automates context-specific repetitive edits by learning transformations from past edits. The main challenge to the example-based approach is in generalizing the examples to transformations that produce correct edits on more than the known examples but also on unseen inputs. Generalizing examples of edits to program transformations can lead to incorrect generalizations, that produce a false negative or a false positive. A false negative is where a program transformation does not produce an intended edit in a location that should be changed. False negatives increase the burden on developers to provide more examples or to perform more edits themselves, reducing the number of automated edits. Additionally, false negatives may lead developers to miss edits leading to bugs and inconsistencies in the source code.

A false positive produces an incorrect edit. False positives are often related to transformations that are too general. The proliferation of false negatives and false positives may deter a developer from using a software tool. Hence, finding the correct level of generalization is crucial for the adoption of such systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A synthesis procedure learns program transformations on-the-fly from supervised examples of repetitive edits made during an edit session of a source code program and from an unsupervised set of additional inputs obtained from the source code. The additional inputs are obtained from direct user feedback, implicit user feedback inferred from a cursor position and automatically-inferred feedback from inputs in the source code program.

A reward score is used to categorize an additional input as either a positive input or a negative input. The synthesis procedure attempts to produce outputs on the positive inputs using the supervised examples with provenance analysis and anti-unification. For those positive inputs for which an output is generated consistent with the existing examples, the synthesis procedure synthesizes a new program transformation which is added to the set of examples. The program transformations are then used to produce code edit suggestions during the edit session.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Figure 1:
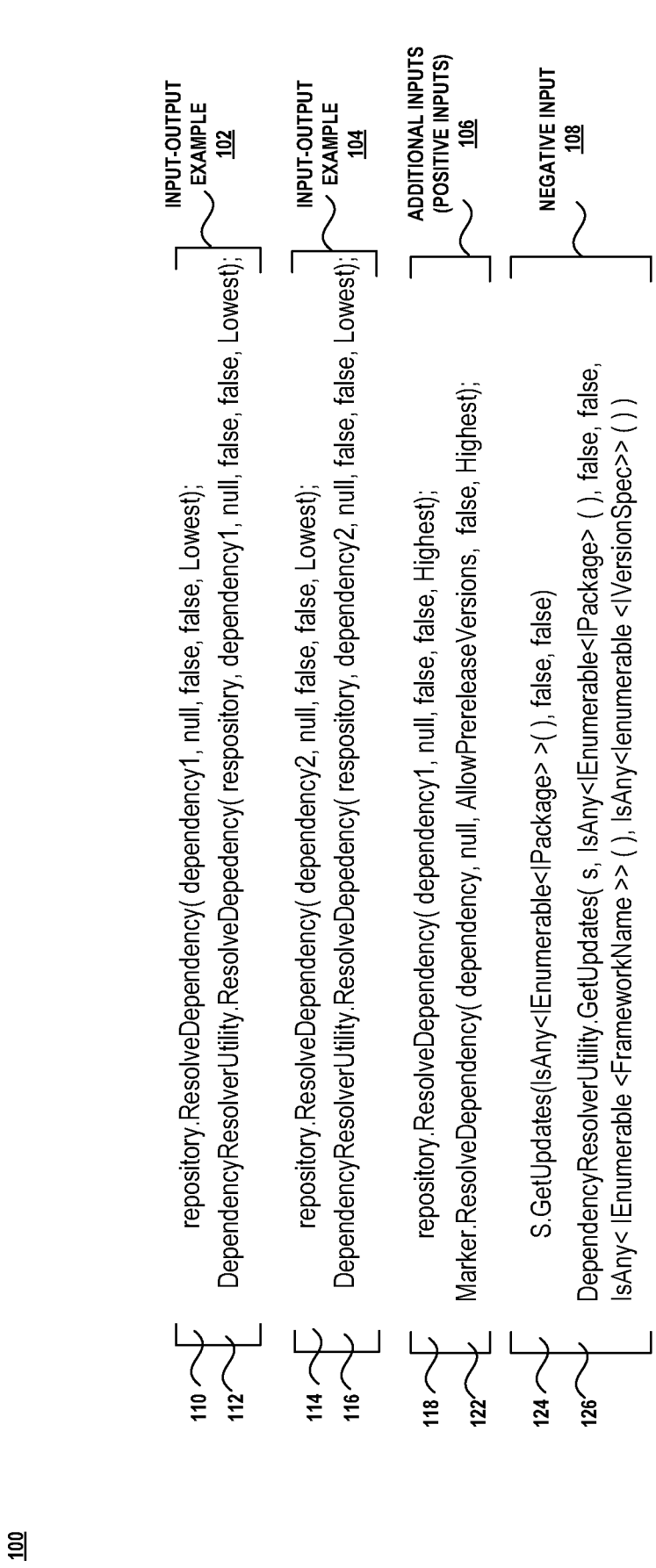
FIG. 1 illustrates exemplary user interfaces showing edits made to a source code program during an edit session.

The subject matter disclosed herein pertains to a feedback-driven semi-supervised technique to synthesize program transformations. The technique uses a combination of anti-unification and programming-by-example synthesis technology to learn program transformations (i.e., rewrite rules) that can be generalized to unseen inputs.

Program synthesis is a technique that learns a program in a programming language that meets a developer's intent as expressed in some specification. A goal is to generate a program that is consistent with the provided examples and to produce outputs on all additional positive inputs and not on any additional negative inputs.

Programming-by-example synthesis learns a program from a specification that consists of examples of the form i→o, where i is an example input and o is the output of the program on input i. A program transformation or rewrite rule represents the edits made to an example input i to produce an output o that is semantically equivalent to input i. Generalization is the process of converting the input-output examples to correct program transformations. Anti-unification is one such generalization process that constructs a program transformation from common examples.

In one aspect, the technique uses concrete examples (i.e., supervised data) and additional inputs provided from the source code program during a real-time edit session (i.e., unsupervised data) to learn how to generalize program transformations to unseen inputs. The program transformations may then be used to automatically generate code edit suggestions during the edit session.

A few repetitive edits form examples that are used to train the synthesis procedure to learn a general transformation. Additional inputs are obtained directly from the user, inferred from the programming environment (i.e., cursor position in editing session), and/or automatically-inferred from feedback from the edit session (i.e., all subtrees of the AST of the program that the user is currently editing). The additional inputs are used to further generalize a program transformation.

A feedback engine is used to evaluate whether an additional input should be accepted to generalize a program transformation. A reward score is used to classify an additional input as either positive or negative depending on whether a program transformation applies to the additional inputs. The reward score is used to identify those additional inputs that are likely to provide fruitful disambiguation while preserving the runtime efficiency needed for interactive use.

The reward score is generated from a number of factors including (a) if the user manually indicates whether an input should be marked as a positive input or a negative input, (b) whether applying a produced edit leaves the program in a compatible state, and (c) whether the produced edit for an input is similar to or different from the examples.

There is a continuous interaction between the feedback engine and the synthesis procedure to find additional inputs and to produce a program transformation that is consistent with the examples and the additional positive and negative inputs. At each iteration, thresholds are computed to control the classification of a positive and negative input in order to avoid over-generalization of the program transformations.

At certain points in the edit session, the synthesis procedure detects a user's cursor positioned at a location in the source code program. The synthesis procedure searches for input subtrees from the examples that correspond to the text at the cursor location in order to provide code edit suggestions.

Attention now turns to a more detailed description of the system for feedback-driven semi-supervised synthesis of program transformations.

A System for Feedback-Driven Semi-Supervised Synthesis of Program Transformations Turning to FIG. 1, there is shown an exemplary user interface of an editor session. In this session, the developer has refactored the ResolveDependency method to make it static and then moved it to a new static class, DependencyResolveUtility. Input-output example 102 shows a line of C# source code 110, repository.ResolveDependency(dependency1, null, false, false, Lowest), that was changed to DependencyResolverUtility.ResolveDepedency(repository, dependency1, null, false, false, Lowest) 112. Input-output example 104 shows an input of C# source code 114, repository.ResolveDependency(dependency2, null, false, false, Lowest), that was changed to an output, DependencyResolverUtility.ResolveDepedency(repository, dependency2, null, false, false, Lowest). These two examples differ in the first method argument, dependency1 and dependency2, respectively.

From these two concrete examples (i.e., repetitive edits), the synthesis procedure learns a program transformation to automate similar invocations of the ResolveDependency method with five arguments where the only difference is in the first argument. Additional inputs are detected at several locations in the program that share the same general structure which is a method invocation to the ResolveDependency method with five arguments although with different subexpressions.

As shown in FIG. 1, the additional input 118, repository.ResolveDependency(dependency1, null, false, false, Highest), differs in the last argument, Highest. The additional input 120, Marker.ResolveDependency(dependency, null, AllowPrereleaseVersions, false, Highest), differs in the call target, the third argument and the fifth argument. A feedback engine analyzes the additional inputs 118, 120 to classify them as either a positive input or a negative input. The positive inputs represent locations where the transformation should produce an edit and a negative input represents where the transformation should not produce an edit.

As shown in FIG. 1, the method invocation 124, S.GetUpdates (IsAny<IEnumerable<IPackage>>( ), false, false), is refactored to DependencyResolverUtility.GetUpdates(s, IsAny<IEnumerable<IPackage>( ), false, false, IsAny<IEnumerable<FrameworkName>>( ), IsAny<IEnumerable<IVersionSpec>>( )) 126. The feedback engine classifies this additional input as a negative input which should not produce an edit.

Figure 2:
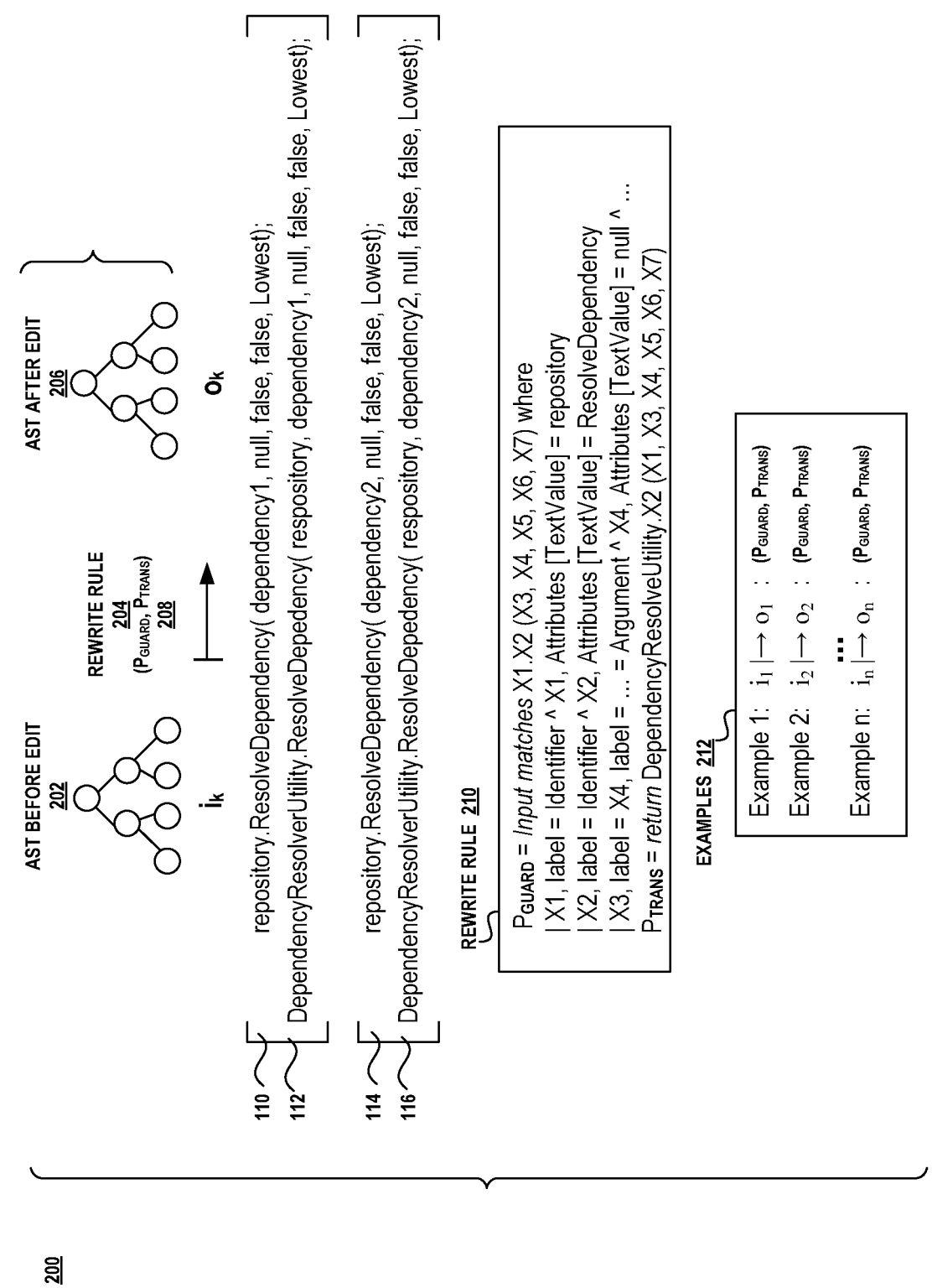
FIG. 2 is a schematic diagram illustrating program transformations as rewrite rules incorporated into a set of examples.

FIG. 2 illustrates various representations of a program transformation 200. In program synthesis, a program is represented as a data structure, such as an abstract syntax tree (AST). An AST represents the syntactic structure of the program in a hierarchical or tree structure. The AST is an n-ary tree data structure that includes nodes that represent a construct in the grammar of the programming language of a program. The AST includes one root node, multiple internal nodes, and multiple leaf nodes. The internal nodes are labeled by operators and the leaf nodes represent the operands of the operators. A node in the AST includes a label, a set of attributes, and a list of children, if any. A label represents the node type, i.e., the syntactic construct of the programming language corresponding to the AST node such as Identifier (representing variable names, method names, etc.) and Invoke Expression (representing function and method calls). The attributes indicate a text value of a leaf node and the children of a node represent the operands of the associated operator. A subtree of an AST T is a tree consisting of a node in T and all of its descendants in T.

A program transformation is a partial function that maps ASTs to ASTs (e.g., AST 202 to AST 206). A program transformation is specified in a domain-specific language (DSL) and has a sequence of distinct rewrite rules, $r_1, \ldots, r_n$. Each rewrite rule $r_i$ 204 includes a list of edits that should be applied to a set of locations in an input AST. The locations are determined by filtering all nodes within the input AST with a pattern-matching predicate. Each rewrite rule matches one or more subtrees of an input AST and outputs modified versions of these subtrees. Each edit replaces a node in the input AST with a new node. A rewrite rule includes a guard and transformer pair ($P_{GUARD}$, $P_{TRANS}$) 208. $P_{GUARD}$ represents the locations in an input AST where operations should be applied and $P_{TRANS}$ represents the operations to be applied to the locations in the input AST.

As shown in FIG. 2, the rewrite rule for the refactorings shown in FIG. 1, 110, 112, 114, 116 include a program transformation pair, $P_{GUARD}$, $P_{TRANS}$, 210, that can be represented in terms of templates as follows:

$P_{GUARD}$=Input matches $X_1$, $X_2$ ($X_3$, $X_4$, $X_5$, $X_6$, $X_7$) where

|$X_1$, label=Identifier^$X_1$, Attributes [TextValue]=repository
|$X_2$, label=Identifier^$X_2$, Attributes [TextValue]=ResolveDependency
|$X_3$, label=$X_4$, label= . . . =Argument^$X_4$, Attributes [TextValue]=null^. . . ; and
$P_{TRANS}$=return DependencyResolveUtility.$X_2$ ($X_1$, $X_3$, $X_4$, $X_5$, $X_6$, $X_7$).

The $P_{GUARD}$ includes a location expression that is used on a set of nodes of an input AST to find subtrees that match the expression. $P_{TRANS}$ represents the operation that is applied to the matching locations in the input AST. In the example above, $P_{GUARD}$, is a conjunction of predicates (e.g., $X_1$, label=Identifier^$X_1$, Attributes [TextValue]=repository) over nodes of the AST. The nodes are identified using XPath-like queries and the predicates test the label, attributes or position of the nodes to find matches.

There are two types of transformers, $P_{TRAN}$: selections and constructions. A selection returns a subtree of the input. The subtree is identified as the $n^{th}$ node of the AST that satisfies a guard, $P_{GUARD}$. A construction returns a subtree that is constructed specifying the kind of node, its attributes, and its children. The children may be constructed using several different operators. For example, the operator InsertChild (select, pos, node) selects a node, called parent, from the input and returns the parent's children with an additional node at the position pos.

During an edit session, the synthesis procedure maintains a set of examples 212 that have a corresponding program transformation or rewrite rule, $P_{GUARD}$, $P_{TRANS}$. The set of examples, i|→o, represent an input subtree i and an output subtree o that was transformed through the rewrite rule, $P_{GUARD}$, $P_{TRANS}$ The set of examples 212 is updated from the user's implicit and explicit feedback during the edit session.

Figure 3:
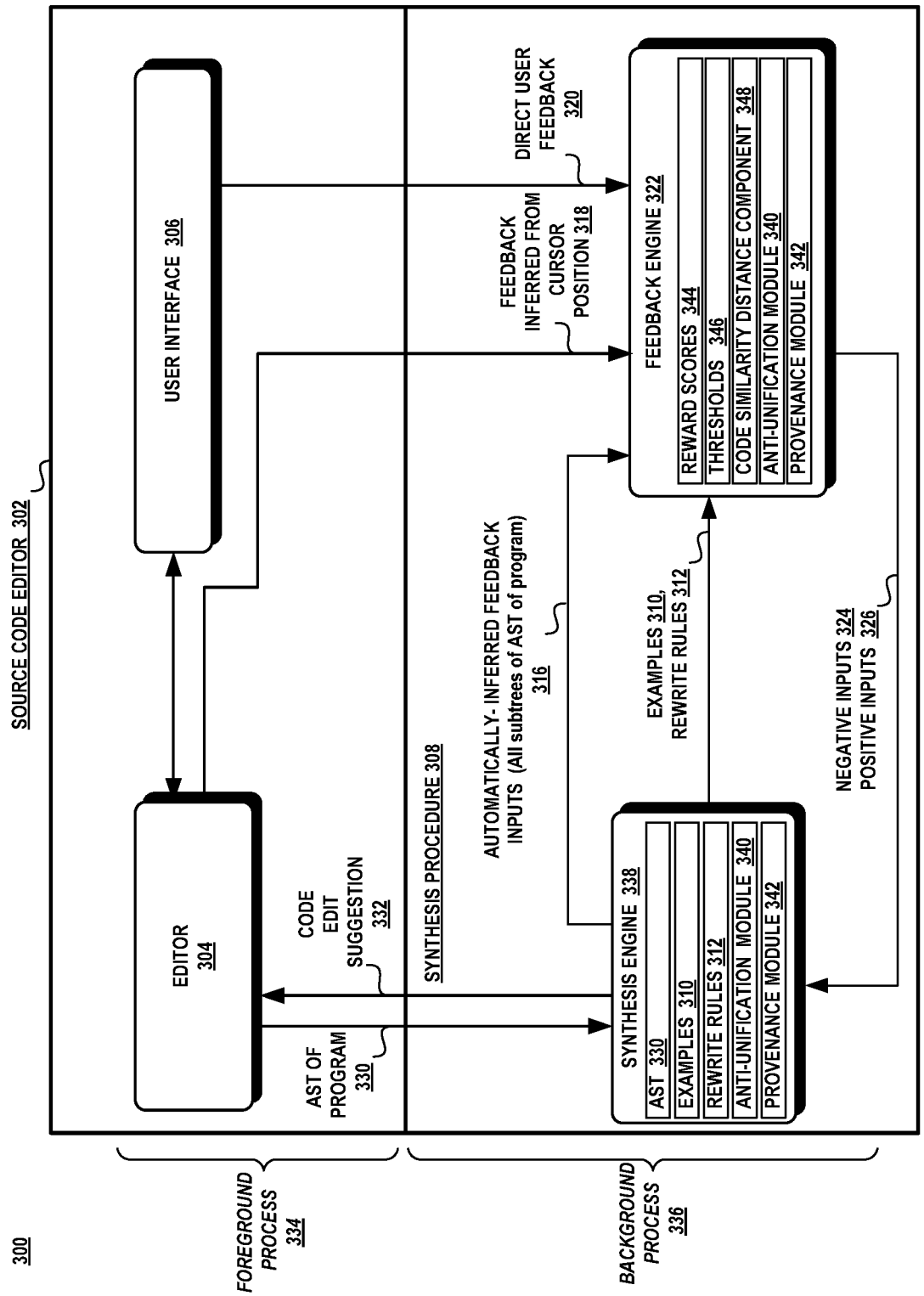
FIG. 3 is a schematic diagram illustrating an exemplary system for the feedback-driven semi-supervised synthesis of program transformations.

FIG. 3 represents an exemplary system embodying the techniques of the feedback-driven semi-supervised program transformation synthesizer. In one aspect, the system 300 may be embodied in a source code editor 302 configured for editing source code programs. The source code editor 302 may be a stand-alone tool or part of a larger application, such as a web browser or integrated development environment (IDE). It should be noted that the system is not limited to a source code editor and the techniques disclosed herein are applicable to any tool capable of editing a text document such as word processors, email applications, spreadsheets, and the like.

A source code editor 302 includes an editor 304, a user interface 306, and a synthesis procedure 308. The foreground process 334 interacts with the developer to provide typical editing functions and the background process 336 runs independent of the developer to learn program transformations. In one aspect, the editor 304 and the user interface 306 run in the foreground process 334 and the synthesis procedure 308 runs in the background process 336.

The editor 304 is a programming interface that captures and stores source code while written. The editor 304 is designed for a particular programming language. The editor 304 provides functions to create, view, edit and maintain the source code, such as cut-and-paste, auto-formatting, auto-code completion, syntax highlighting, brace matching and the like. The editor transforms the source code in an edit session into an AST 330 which is updated as the source code is edited. The editor 302 interacts with a user interface 306.

The source code editor 302 includes a synthesis procedure 308 that includes a synthesis engine and a feedback engine 322 that facilitates the learning of program transformations. In one aspect, the program transformations or rewrite rules 312 are used to provide code edit suggestions 332.

The synthesis procedure 308 learns to generalize a program transformation (i.e., rewrite rule) 312 from the examples 310 and the additional negative and positive inputs 324, 326, on-the-fly during the edit session. Initially, concrete examples are obtained from a few repeated edits performed during an edit session. New examples are added to the initial set of concrete examples from the additional positive inputs based on whether a candidate output can be generated for the additional positive input that is consistent with the existing examples. An output is produced by using the existing examples along with a combination of provenance data provided by a provenance module 342 and anti-unification data provided by an anti-unification module 340.

The provenance module 342 indicates the fragments of the example outputs that are dependent on the fragments of the example inputs and the subprograms that are used to transform the input fragments to the output fragments. The anti-unification module 340 identifies corresponding subtrees among different input ASTs, such as which subtrees of the examples are associated with which subtrees of the additional positive inputs. Using the provenance and the anti-unification data, an output for each additional positive input may be generated. The synthesis engine 338 then synthesizes a program transformation from the existing examples and the new examples obtained from each additional positive input with its candidate output. The new examples are then included as part of the current set of examples 310.

The feedback engine 322 receives additional inputs during an edit session and determines whether the additional inputs are positive inputs or negative inputs. A reward score 344 is computed for each additional input that indicates whether the additional input is a positive input or a negative input. The reward score for a positive input is represented by a positive constant and the reward score for a negative input is represented by a negative constant. Thresholds 346 are computed to regulate how the reward scores are determined. A code similarity distance component 348 is used to compute a reward score for certain additional inputs and is described in further detail below.

The additional inputs may be obtained from user feedback (i.e., direct feedback from user 320), from feedback obtained implicitly from the edit session (i.e., feedback inferred from cursor position 318), and from automatically-inferred feedback 316.

The direct user feedback 320 is obtained through the user interface 306. A developer may explicitly indicate that a particular code segment is an additional input when the user indicates an edit was not made for the particular code segment that should have been made, such as in the case of a false negative. The additional input is represented by the subtree of the AST corresponding to the particular code segment.

In addition, the feedback engine 322 receives additional inputs from the current cursor position in the edit session 318. The cursor position acts as a proxy for the user and indicates implicitly that the user wants to edit the current cursor location. The current cursor location is ambiguous and the particular subtree of the AST that the user wants to edit may be any of the subtrees present at the current cursor position. The feedback engine 322 receives the ASTs of the source code program as inputs 328 from the synthesis engine 338 to find those subtrees relevant to the current cursor position.

Consider the code segment shown in label 118 in FIG. 1. Suppose the developer places the cursor at the beginning of that code segment. There are many subtrees that may include this location, including those that correspond to the following code fragments: repository and repository.ResolveDependency( ). The later is the input that should be classified as the positive input. The feedback engine 322 identifies whether the additional inputs from the cursor position are positive or negative inputs and this process is described in further detail below.

The feedback engine 322 also receives additional inputs automatically-inferred from all the nodes in the AST of the source code in the edit session. This type of additional input is relevant when user feedback is not feasible such as when the developer is not aware of all the locations that must be changed or when the developer may want to apply the edits in instead of inspecting each one for correctness. The feedback engine 322 identifies which of these additional inputs are positive or negative inputs and this technique is described in further detail below.

Methods

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 4:
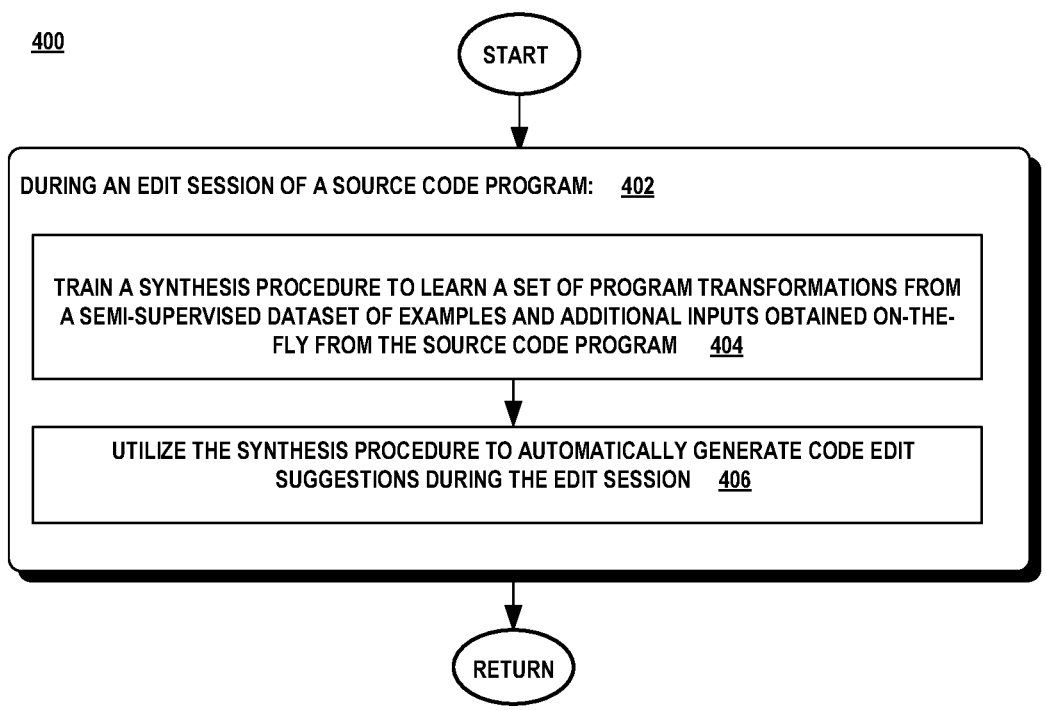
FIG. 4 is a flow diagram illustrating an exemplary method of training a synthesis procedure to learn to generalize program transformations during an edit session.

Turning to FIG. 4, there is an exemplary method 400 that utilizes the system and device disclosed herein. During an edit session, the synthesis procedure 308 learns a set of program transformations from a semi-supervised dataset of examples and additional inputs obtained from the source code program being edited (block 402). The synthesis procedure 308 uses the program transformations to automatically generate code edit suggestions during the edit session (block 404).

Figure 5:
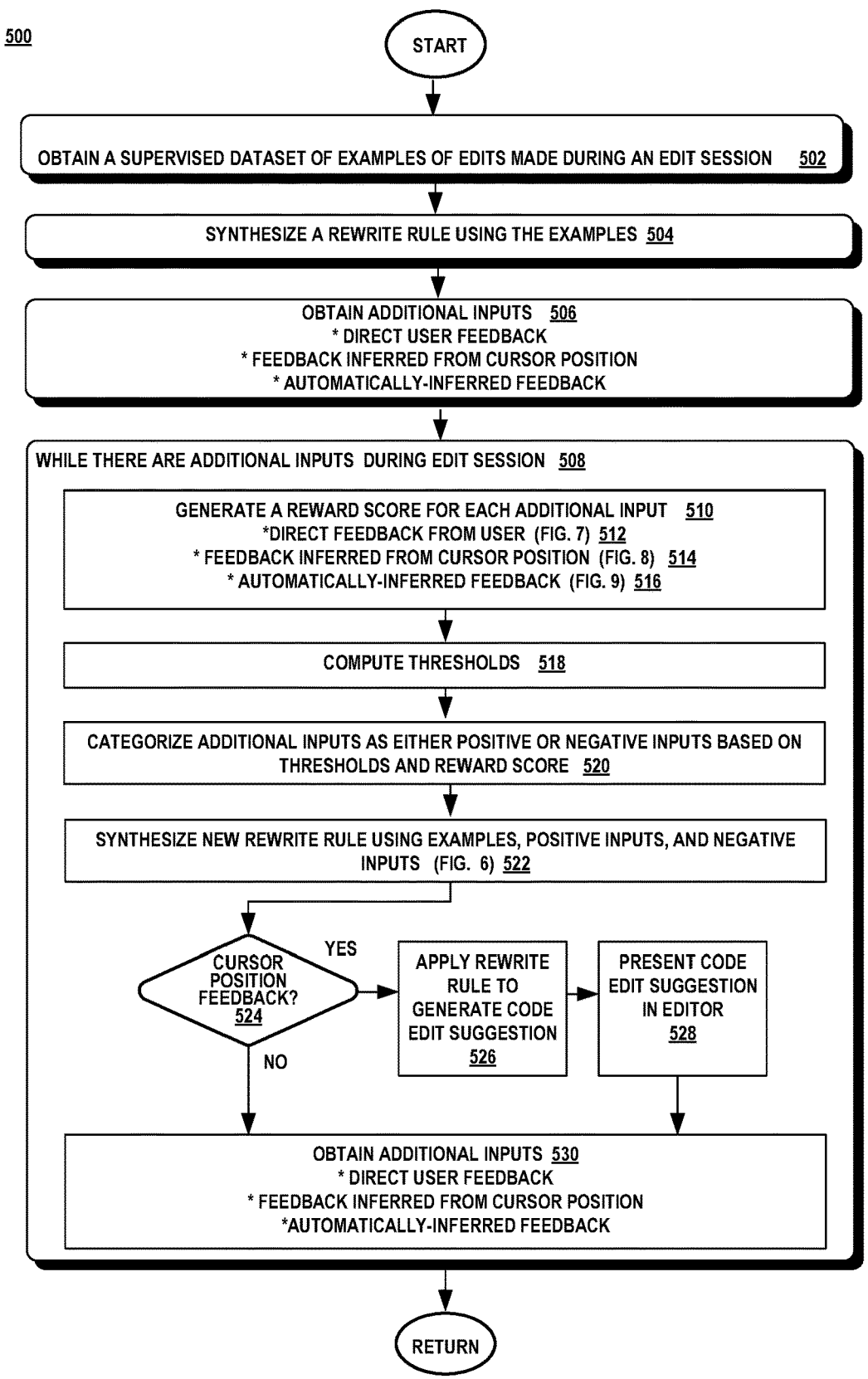
FIG. 5 is a flow diagram illustrating an exemplary method of a synthesis procedure learning program transformations during an edit session from examples and additional inputs.

FIG. 5 illustrates an exemplary method 500 of the synthesis procedure 308. The synthesis procedure 308 uses repetitive edits as the input-output examples. The synthesis procedure 308 operates in a background process tracking the edits made to a program during an edit session (block 502). The synthesis procedure 308 recognizes those repeated edits made in a similar context (block 502) and synthesizes a program transformation or rewrite rule using the repeated edits (block 504).

Additional inputs are obtained continuously during the edit session (block 506). The additional inputs can be obtained from user feedback (i.e., direct feedback from user 320), from feedback obtained implicitly from the edit session (i.e., feedback inferred from cursor position 318), and from automatically-inferred feedback 316 (block 506).

The synthesis procedure 308 iterates continuously evaluating the additional inputs obtained from the edit session (block 508). In each iteration, the feedback engine 322 generates a reword score for each additional input (blocks 510-516). The reword score indicates whether an additional input should be considered a positive input or a negative input (blocks 510-516). The calculation of the reward score differs based on the source of the additional input and is discussed in more detail below.

The feedback engine 322 computes thresholds for the additional inputs (block 518). The thresholds are used to control the classification of the positive and negative inputs in order to avoid over-generalizing and under-generalizing the examples. There is a threshold for the additional positive inputs, p, and a threshold for the additional negative inputs, n. The thresholds are computed differently for each source of additional inputs. In the case of direct feedback from the user, n and p are set to zero, thereby allowing the user full control over adding additional positive and negative inputs. In the case of the automatically-inferred feedback and the feedback inferred from a cursor position, the user sets the values for the thresholds, n and p.

The feedback engine 322 categorizes an additional input based on the reword score and the thresholds (block 520). An additional input is classified as a positive input when the reword score is greater than the positive input threshold, p, and an additional input is classified as a negative input when the reward score is less than the negative input threshold, n (block 520). The feedback engine 322 indicates to the synthesis procedure 338 the additional positive and negative inputs (block 520).

The synthesis procedure 338 synthesizes a new rewrite rule using the existing examples and the additional positive and negative inputs provided from the feedback engine. A new rewrite rule is generated when the synthesis procedure is able to produce an output on the additional positive inputs consistent with the existing examples. An output is produced by using the current set of examples i|→o and a combination of provenance analysis and anti-unification (Collectively, block 522). If an output cannot be produced, the process discards the additional positive input and proceeds to obtain additional inputs (block 530) iterating through blocks 510, 518, 520, 522 to block 524 until there are no more additional inputs, such as when the edit session ends. The additional inputs come from direct user feedback, cursor position feedback and/or automatically-inferred feedback (block 530)

In the scenario where an additional input comes from the cursor position feedback (block 524—yes), the new rewrite rule is used to generate a code edit suggestion (block 526) which is presented to the developer in the user interface of the source code editor (block 528).

Figure 6:
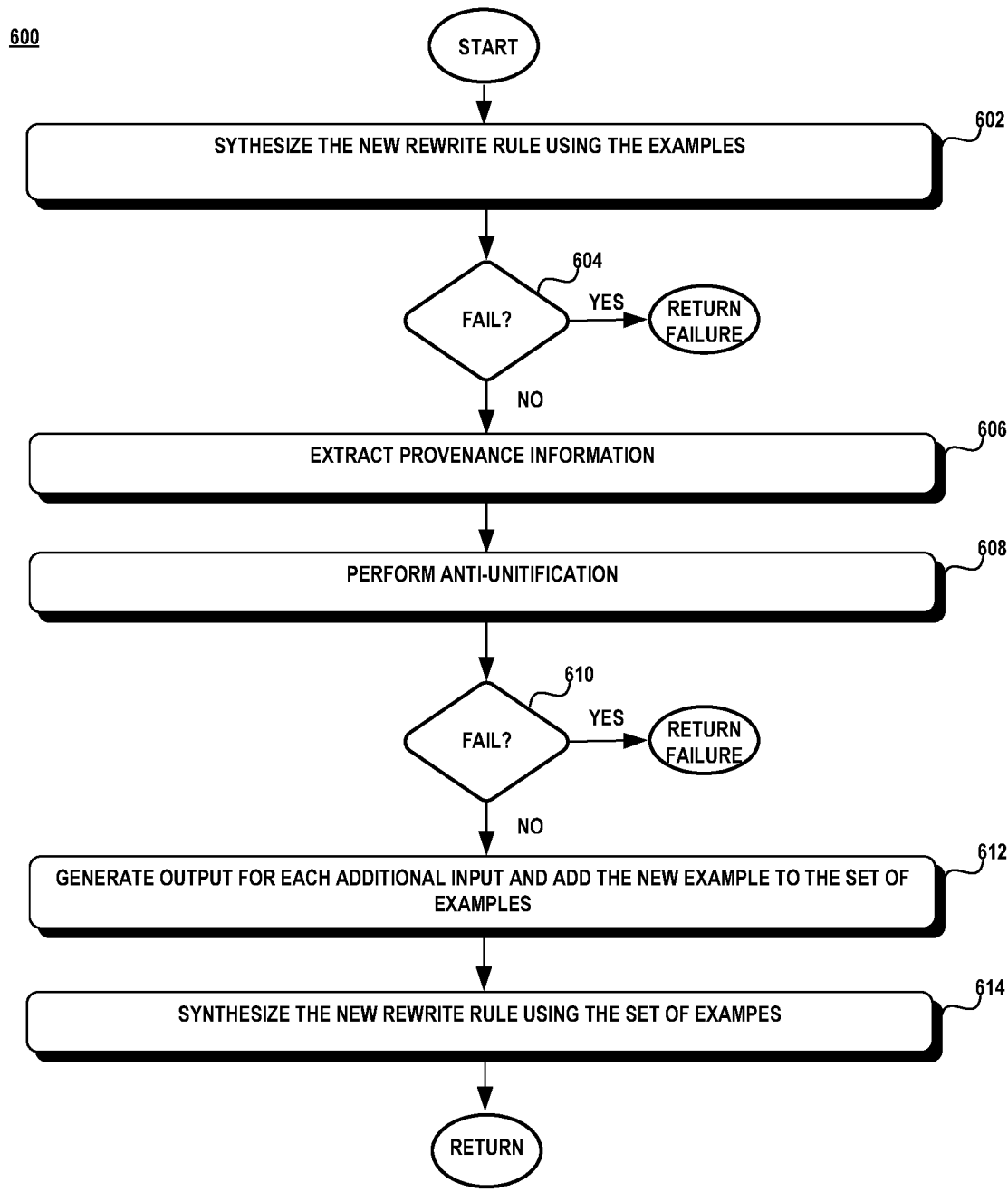
FIG. 6 is a flow diagram illustrating an exemplary method for synthesizing an additional positive input into a rewrite rule that is consistent with existing examples.

Turning to FIG. 6, there is shown a method 600 for synthesizing a rewrite rule using the examples and additional inputs. Initially, the synthesis engine 338 synthesizes a new rewrite rule using the existing examples (block 602). The new rewrite rule needs to be consistent the existing examples (block 602). If the synthesis engine 338 fails to synthesize a new rewrite rule with the existing examples (block 604—yes), the process returns failure and discards the additional positive input (FIG. 5, block 524).

Otherwise, when the synthesis engine 338 succeeds to synthesize a new rewrite rule with the existing examples (block 604—no), the synthesis engine 338 extracts provenance information from each example (block 606). The provenance information identifies the fragments of the example outputs that are dependent on fragments of the example inputs and the sub-programs that are used to transform the input fragments to the output fragments (block 606).

Given the program transformation, $P_{TRANS}$, and an example i|→o, the provenance information takes the form of $SP_0 \leftarrow s_{i0}, \ldots, SP_n \leftarrow s_{in}$, where (a) each $si_j$ is a subtree of i, and (b) each $SP_j$ is a subprogram of $P_{TRANS}$ that is a select, and $SP_j$ produces the output $si_j$ during execution of $P_{TRANS}$ (Si). $SP_j$ may have multiple subtrees $si_j$ and $si'_j$ such that $SP_j \leftarrow si_j$ and $SP_j \leftarrow si'_j$.

For example, consider rewrite rule 208 of FIG. 2, $P_{TRANS}$=DependencyResolveUtility.X2 (X1, X3, X4, X5, X6, X7), and the following input-output example: Repository.ResolveDependency (dependency1, args . . . )|→DependencyResolverUtility.ResolveDependency(repository, dependency1, args . . . ).

The provenance information is given by π={select1←ResolveDependency, select2←repository, select3←args . . . }. A selection-type $P_{TRANS}$ returns a subtree of the input, i.e., for every part of the output that also appears in the input there exists a selection sub-program that is used to generate the corresponding part of the output from the input. The provenance information associates each selection sub-program in the rewrite rule with the part of the output it generates.

In the above example, "ResolveDependency" is a part of the output "DependencyResolvedUtility.ResolveDependency(repository, dependency1, args . . . )" that is also a part of the input "Repository.ResolveDependency(dependency1, args . . . )". In $P_{TRANS}$=DependencyResolverUtility.X2(X1, X3, X4, X5, X6, X7), the selection sub-program of $P_{TRANS}$ that is responsible for producing "ResolveDependency" in the output is represented by X2 or select1. Hence, the provenance information includes "select1←ResolveDependency". By similar reasoning, we have "select2←repository" and "select3←args" in the provenance information with select2 and select3 corresponding to "X1" and "X3, X4, X5, X6, X7", respectively.

The synthesis engine then performs the anti-unification of the inputs and additional positive inputs (block 608). Anti-unification is a generalization process which can identify a corresponding subtree among different input ASTs. For example, consider the simple change from if (score<threshold) to if (IsValid(score)) and the user indicates that the transformation should apply to if (GetScore(run)<threshold). The anti-unification process identifies that score corresponds to GetScore(run) in the example input and the candidate additional input if (GetScore(run)<threshold). The anti-unification-based generalization process tries to compute a generalization where each selected node in the example input has a corresponding node in the candidate additional input.

By way of another example, if the candidate additional input was if (UnrelatedCondition( )), then the process infers the correspondence between score<threshold and UnrelatedCondition( ), but the subtree score itself has no corresponding subtree, which causes the anti-unification to fail to find a generalization. If anti-unification fails (block 610—yes), the candidate additional input is not compatible and discarded. Otherwise (block 610—no), a new example from the candidate additional input is generated and the parts of the transformation using the new example are re-synthesized using the new example. For the scenario above, the new example is if (GetScore(run)<threshold)|→if (IsValid (GetScore(run))).

Given two inputs $i_1$ and $i_2$, the anti-unification $i_1 \bowtie i_2$ is given by a pair $(\tau(\sigma_1, \sigma_2))$ such that template $\tau$ is an AST with holes $\{h_0, \ldots h_n\}$, and the two substitutions $\sigma_1$, $\sigma_2$: $\{h_0, \ldots h_n\}|$→T such that $\sigma_1(\tau)=i_1 \wedge \sigma_2(\tau)=i_2$.

For example, consider two inputs $i_1$=if (score<threshold) and $i_2$=if (GetScore(run)<threshold). The anti-unification $\bowtie \{i_1, i_2\}$=if ($h_0$<threshold), ($\{h_0|$→score$\}$, $\{h_0|$→GetScore(run)$\}$). The first part of the anti-unification "if ($h_0$<threshold)" extracts a template that represents the parts that are common to both the inputs $i_1$ and $i_2$. In the example, the parts "if", "(", "<", "threshold" and ")" are common to both inputs $i_1$ an $i_2$, and the parts "score" and "GetScore(run)" are different between the inputs. The template retains the common parts of the inputs and replaces all the parts that are different with holes. Hence, the template is "if ($h_0$<threshold)" with the parts differing in the two inputs replaced by $h_0$. The rest of the provenance information associates what the hole $h_0$ represents in each input: For $i_1$, the part of the input that was replaced by $h_0$ is "score" and for $i_2$, it is "GetScore(run)". This identifies that "$h_0 \mapsto$ score" and "$h_0 \mapsto$ GetScore(run)" are the remaining two parts of the anti-unification, giving $\bowtie \{i_1, i_2\}$=if ($h_0$<threshold), ($\{h_0|$→score$\}$, $\{h_0|$→GetScore(run)$\}$).

Anti-unification $i_1 \bowtie i_2$ is computed as follows. The inputs $i_1$ and $i_2$ are represented by respective ASTs. If the roots of $i_1$ and $i_2$ have different labels or attributes, then $i_1 \bowtie i_2$=(h, ($\{h|$→$i_1\}$, $\{h|$→$i_2\}$)). If the roots of $i_1$ and $i_2$ have the same label and attributes, we recursively compute the anti-unification of each corresponding child of the roots of $i_1$ and $i_2$, and combine them.

For both $i_1$ and $i_2$, the label of the root node is "If Statement" and there are no attributes. Since these are the same, the process recursively computes the anti-unification of the children. The children of the root of $i_1$ are "if", "(", "score<threshold", and ")"; and the children of $i_2$ are "if", "(", "GetScore(run)<threshold", and ")". Recursively computing the anti-unification of the corresponding children, the sub-tasks are computing anti-unification of "if" with "if", "(" with "(", "score<threshold" with "GetScore(run)<threshold", and ")" with ")". For all except the third task, the anti-unification is simple since they are equal: "if" with "if" returns "if, ({ }, { })" and so on. For anti-unifying "score<threshold" and "GetScore(run)<threshold", the label of the corresponding root nodes is now both "LessThanExpression", both with no attributes, and the children being "score", "<", "threshold" and "GetScore(run)", "<", and "threshold".

There are again recursive sub-tasks of computing the anti-unification of "score" with "GetScore(run)", "<" with "<", and "threshold" with "threshold". For the first child, "score" and "GetScore(run)" have different root labels: "score" has label "Identifier" and "GetScore(run)" has label "InvokeExpression". Hence, the anti-unification is "h, ($\{h \bowtie$ score$\}$, $\{h \mapsto$ GetScore(run)$\}$)". Combining the results of all the sub-tasks, the final result is "if (h<threshold), ($\{h \mapsto$ score$\}$, $\{h \mapsto$ GetScore(run)$\}$)".

If the anti-unification fails (block 610—yes), the additional positive input is discarded. Otherwise (block 610—no), an output is generated for each additional positive input which is then added to the new set of examples (block 612). The synthesis procedure then synthesizes the rewrite rule using the new set of examples (block 614).

Figure 7:
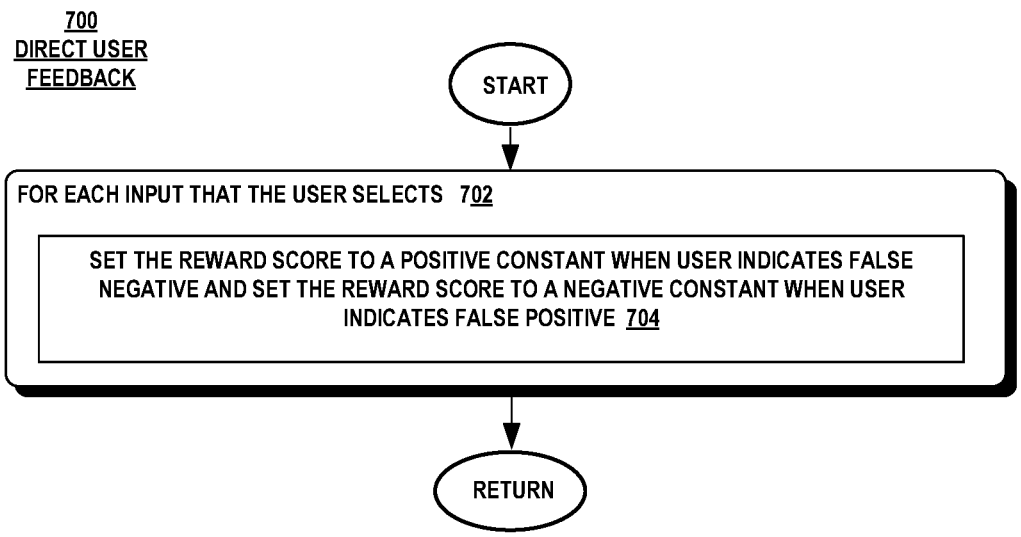
FIG. 7 is a flow diagram illustrating an exemplary method for classifying additional inputs obtained from direct user feedback.
Figure 8:
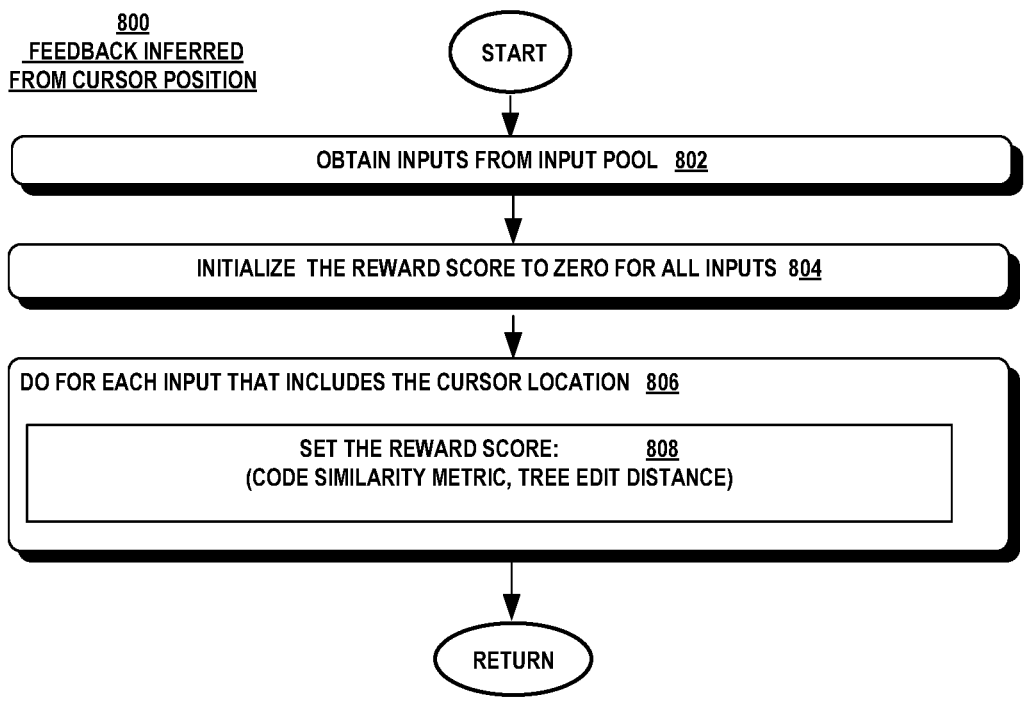
FIG. 8 is a flow diagram illustrating an exemplary method for classifying additional inputs inferred from a cursor position.
Figure 9:
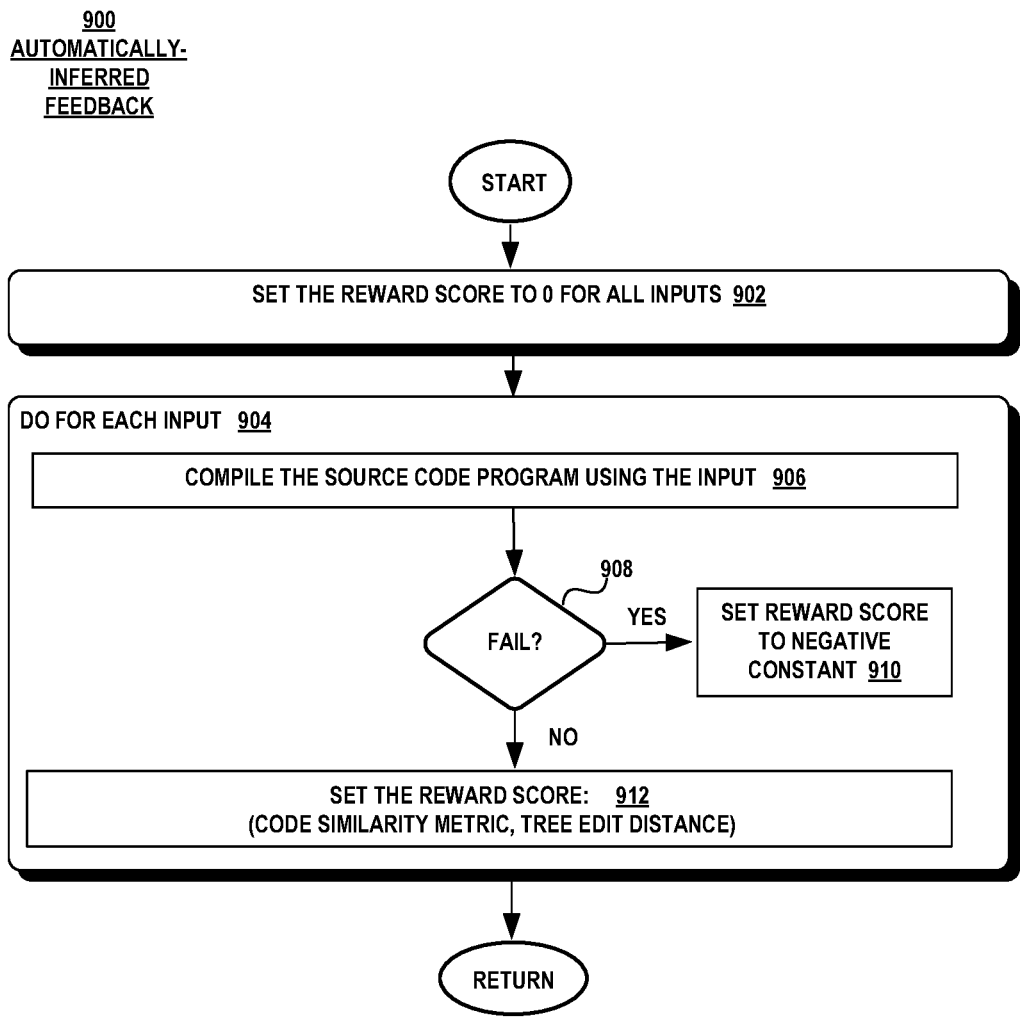
FIG. 9 is a flow diagram illustrating an exemplary method for classifying additional inputs from automatically-inferred feedback.

FIGS. 7-9 illustrate the computation of the reward score for the source of each additional input. Turning to FIG. 7, the reward score for each additional input that is obtained from direct user feedback (block 702) is deemed a positive input with a reward score set to a large positive constant (e.g., +∞) (block 704). Any additional input that a user indicates as a negative input is given a reward score that is set to a negative constant (e.g., $-\infty$) (block 704).

FIG. 8 illustrates an exemplary method 800 for calculating the reward score for feedback inferred from a cursor position. The cursor position indicates implicitly that the user wants to edit the source code at the current cursor location. From this cursor location, the method attempts to find additional inputs from the context of the current cursor location using all the inputs in the Input Pool (block 802). The Input Pool consists of all the subtrees of the AST representing the source code program in the edit session.

Initially, the reward score for all inputs in the Input Pool is initialized to zero (block 804). From these inputs, the feedback engine filters the inputs in the Input Pool to the subtrees present at the current cursor position which are referred to as candidate inputs (block 806).

The reward score for each input that includes the cursor position is set using a distance function that is based on a code-similarity metric between an input AST and an example input AST (e.g., clone-detection based code similarity metrics or tree edit distance). The distance function identifies similar subtrees by characterizing a subtree with numerical vectors and then clusters these vectors with respect to a Euclidean distance metric. In one aspect, the distance function is computed as one minus the code-similarity metric, (1−code similarity metric(input, example input). In another aspect, the distance function can utilize a tree edit distance. A tree edit distance is a minimum cost sequence of node edit operations that transform one tree into another tree. These metrics return a zero score if the two inputs are the same, a low score if the two inputs are similar but not the same, and a high score if the two inputs are dissimilar from each other. (Collectively, block 808).

Upon completion of the iterations of all the candidate inputs, the reward scores are returned to the synthesis procedure (block 810).

FIG. 9 illustrates an exemplary method 900 for computing the reward score for the automatically-inferred inputs. This method uses all the inputs in the InputPool which are all the subtrees of the AST of the program being edited. Initially, the reward score for each input is initialized to zero (block 902).

For each input, the recently synthesized rewrite rule (e.g., from step 504 or 522 of FIG. 5) is applied (block 906). If the rewrite rule does not apply, i.e., returns null, or if replacing the input in the source program with the output of the rewrite rule produces a program that cannot be compiled (block 908—yes), the reward score for this input is set to a large negative constant (e.g., $-\infty$) (block 910).

Whether the resulting program can be compiled or not is checked using a standard compiler. If the compilation succeeds, that is, does not produce a compilation error (block 908—no), the reward score is set using a distance function (e.g., clone detection-based code similarity metrics or tree edit distance) as described above.

Technical Effect

Aspects of the subject matter disclosed herein pertain to the technical problem of synthesizing program transformations on-the-fly during an edit session from semi-supervised data feedback from the source code program. The technical feature addressing this problem is a program synthesizer (i.e., synthesis procedure) that learns program transformations on-the-fly from supervised examples of repetitive edits made during an edit session of a text document and from an unsupervised set of additional inputs obtained implicitly from the source code. The program transformations are used to provide code edit suggestions during the edit session.

This approach differs from techniques that utilize a machine learning model trained on a large and diverse amount of data. By contrast, the synthesis procedure watches the behavior of the user and analyzes code change patterns to discover ad-hoc repetitive edits that form examples. Further user actions are observed during the edit session to obtain additional inputs that may form additional examples provided that can be synthesized with the existing examples. These transformations are generated with a few examples and additional inputs thereby eliminating the extensive pre-training of a machine learning model over large datasets.

This technique differs from type-based statistical techniques that exploit data type information to complete partial expressions, which are difficult or impractical to apply to dynamically-typed languages. This technique avoids that difficulty by utilizing syntax trees.

In order to account for the large size of ASTs and the large number of nodes in an AST representing a source code program, a reward score is used to distinguish those additional inputs that are likely to produce a program transformation thereby preserving the runtime efficiency of the synthesizer that is needed to a real-time interactive setting.

Furthermore, this technique uses a modeless, on-the-fly interaction model in which the user is presented with suggested edits without ever exiting the IDE or edit tool.

Exemplary Operating Environment

Figure 10:
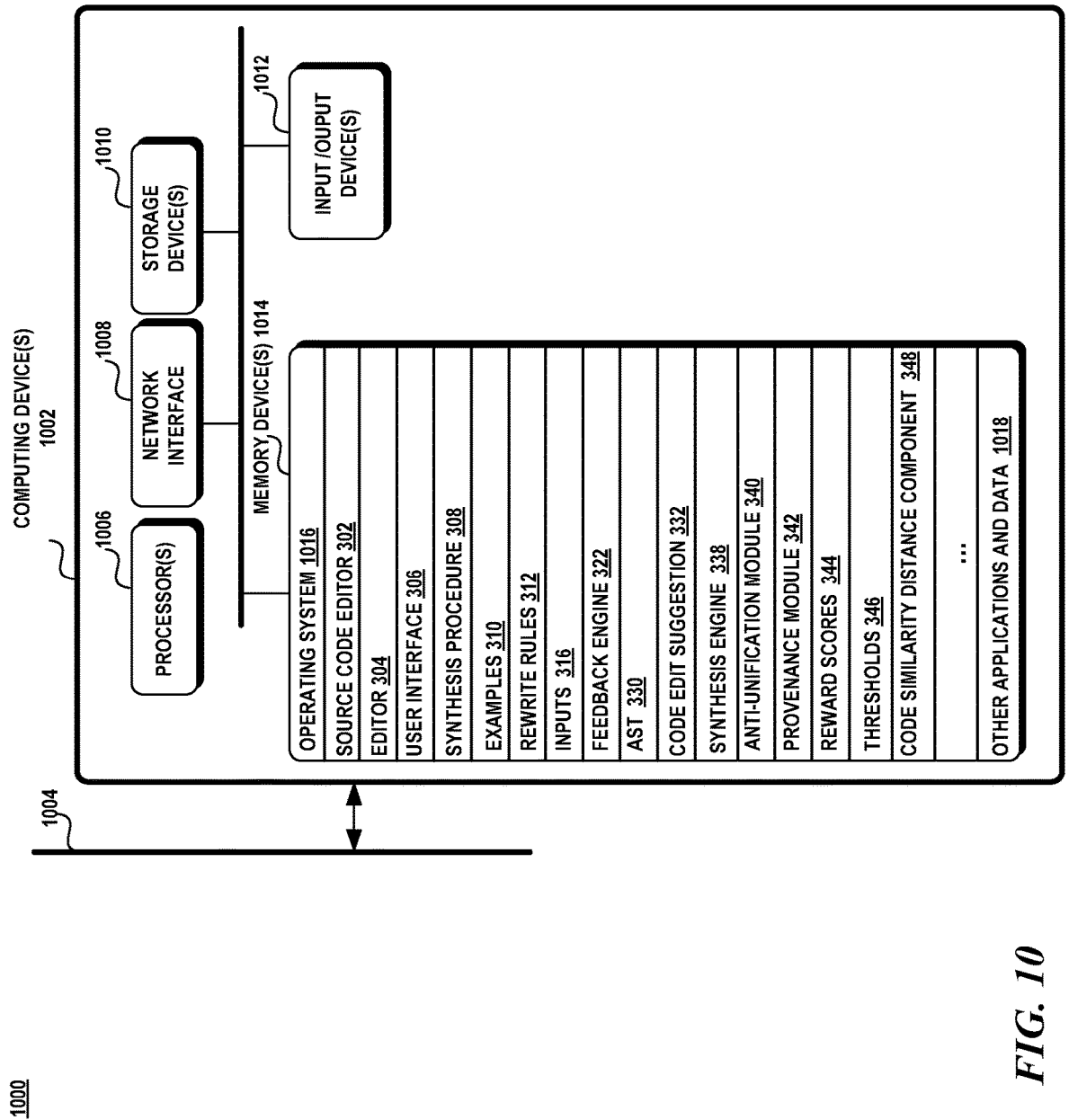
FIG. 10 is a block diagram illustrating an operating environment.

Attention now turns to a discussion of an exemplary operating environment 1000. FIG. 10 illustrates an exemplary operating environment 1000 having one or more computing devices 1002 connected to a network 1004. It should be noted that the operating environment 1000 is not limited to any particular configuration and other configurations are possible.

A computing device 1002 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 1000 may be configured in a network environment, a distributed environment, a multi-processor environment, or a stand-alone computing device having access to remote or local storage devices.

A computing device 1002 may include one or more processors 1006, one or more network interfaces 1008, one or more storage devices 1010, one or more input/output devices 1012, and one or more memory devices 1014. A processor 1006 may be any commercially available or customized processor and may include dual microprocessors and multi-processor architectures. A network interface 1008 facilitates wired or wireless communications between the computing device 1002 and other devices. A storage device 1010 may be computer-readable medium that does not contain propagating signals, such as modulated data signals transmitted through a carrier wave. Examples of a storage device 1010 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 1010 in a computing device 1002. The input/output devices 1012 may include a keyboard, mouse, pen, voice input device, touch input device, display, speakers, printers, etc., and any combination thereof.

A memory device 1014 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 816, 848 may also include one or more external storage devices or remotely located storage devices that do not pertain to propagated signals, such as modulated data signals transmitted through a carrier wave.

The memory device 1014 may contain instructions, components, and data. A component is a software program that performs a specific function and is otherwise known as a module, program, component, and/or application. The memory device 1014 includes an operating system 1016, a source code editor 302, an editor 304, a user interface 306, a synthesis procedure 308, examples 310, rewrite rules 312, automatically-inferred feedback 316, a feedback engine 322, an AST 330, code edit suggestions 332, a synthesis engine 338, an anti-unification module 340, reward scores 344, thresholds 346, a code similarity distance component 348 and other applications and data 1018.

A computing device 1002 may be communicatively coupled via a network 1004. The network 1004 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 1004 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Conclusion

A system is disclosed comprising: one or more processors; and a memory that stores one or more programs that are configured to be executed by the one or more processors, the one or more programs including instructions that: train a synthesis procedure to learn one or more program transformations from a semi-supervised dataset of examples and additional inputs obtained on-the-fly from a text document during an edit session; and utilize the synthesis procedure to automatically generate code edit suggestions during the edit session.

In one aspect, the semi-supervised dataset includes supervised examples from repetitive edits performed in a similar context during the edit session. In one aspect, the semi-supervised dataset includes unsupervised additional inputs automatically-inferred from the text document during the edit session without user feedback. In one aspect, train the synthesis procedure to learn one or more program transformations from a semi-supervised dataset of examples and additional inputs obtained on-the-fly from the source code program during an edit session further comprises: categorize each of the additional inputs as a positive or a negative input based on a reward score; and generate an output for each positive input consistent with each example.

In one aspect, the reward score is based on a code similarity metric or a tree edit distance function. In one aspect, the one or more programs include further instructions that: obtain additional inputs from the text document from explicit feedback from the user. In one aspect, the one or more programs include further instructions that: synthesize a new program transformation when an output is produced on a positive input from at least one example. In one aspect, the text document includes a source code program, a spreadsheet, an email document, or text file.

A computer-implemented method is disclosed, comprising: training a synthesis procedure to learn a program transformation, during an edit session of a text document, from a semi-supervised dataset of feedback derived implicitly from user behavior during the edit session without explicit user feedback, the text document represented as a syntax tree having one or more subtrees, the semi-supervised dataset including examples and additional inputs, the examples derived from repetitive edits to an expression in a similar context, the additional inputs inferred from the text document, the program transformation including an input subtree, an output subtree, and one or more rewrite rules that represent edits made on the input subtree to produce the output subtree; and utilizing the program transformation during the edit session, to generate a code edit suggestion to an expression in the text document, wherein the input subtree of the program transformation matches the expression.

In one aspect, the computer-implemented method further comprises: obtaining an additional input from one or more subtrees representing an expression at a cursor position. In one aspect, the computer-implemented method of claim 9, further comprises: obtaining additional inputs from all subtrees of the syntax tree of the text document. In one aspect, the computer-implemented method further comprises: classifying an additional input as a positive input or a negative input; and when the additional input is classified as a positive input, generating a new example for the positive input that is consistent with the examples.

In one aspect, classifying the additional input as a positive input further comprises: generating a reward score for the additional input based on a code similarity metric or tree edit distance function using the additional input and an example; and designating the additional input as a positive input when the reward score indicates a strong similarity between the additional input and an example and designating the additional input as a negative input when the reward score indicates a low similarity between the additional input and the example.

In one aspect, the computer-implemented method of claim 9, further comprising: obtaining additional inputs from user-directed feedback to expressions in the text document during the edit session. In one aspect, the text document includes a source code program, a spreadsheet, an email document, or text file.

A device is disclosed comprising: at least one processor and a memory; wherein the at least one processor is configured to: represent a text document in an edit session as a syntax tree, the syntax tree having one or more subtrees; learn program transformations during the edit session from supervised examples and unsupervised additional input obtained implicitly from user behavior during the edit session, a program transformation including a pair (Pguard, Ptrans), wherein Pguard includes a location expression to find subtrees of the syntax tree that match the location expression, wherein Ptrans includes operations applied to matching locations of an input subtree that generate the program transformation; and generate a code edit suggestion for an expression at a cursor position when a subtree representing the expression matches an input subtree of a select one of the program transformations, the code edit suggestion generated by application of operations of Ptrans of the select one of the program transformations.

In one aspect, the at least one processor is further configured to: associate one or more examples with a program transformation; and obtain a first one of the one or more examples from repetitive edits made to a similar context during the edit session. In one aspect, the at least one processor is further configured to: add additional examples to the one or more examples from additional inputs derived from implicit feedback, when an output is produced for an additional input that is consistent with existing examples.

In one aspect, the at least one processor is further configured to: filter the additional inputs based on a reward score into a positive input and a negative input, the reward score based on a code similarity metric or tree edit distance function between a subtree representing an additional input and a subtree representing an example. In one aspect, the at least one processor is further configured to: generate an output for an additional input designated as a positive input using the existing examples, positive inputs and negative inputs.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It should be noted that the techniques described herein are not limited to source code documents and source code editors. The techniques are applicable to any text document, such as emails, spreadsheets, word documents, etc. and the tools used to facilitate editing these text documents.

What is claimed:

1. A system comprising:
   one or more processors; and
   a memory that stores one or more programs that are configured to be executed by the one or more processors, the one or more programs including instructions that:
   train a synthesis procedure to learn one or more program transformations from a semi-supervised dataset of examples and additional inputs obtained on-the-fly from a text document during an edit session, wherein a program transformation is a rule that represents edits made to an input that produce a semantically-equivalent output, wherein the semi-supervised dataset includes unsupervised additional inputs automatically-inferred from the text document during the edit session without user feedback; and
   utilize the synthesis procedure to automatically generate at least one code edit suggestion based on a learned program transformation during the edit session, wherein the at least one code edit suggestion is used to replace existing source code.

2. The system of claim 1, wherein the semi-supervised dataset includes supervised examples from repetitive edits performed in a similar context during the edit session.

3. The system of claim 1, wherein train the synthesis procedure to learn one or more program transformations from a semi-supervised dataset of examples and additional inputs obtained on-the-fly from the source code program during an edit session further comprises:
   categorize each of the additional inputs as a positive input or a negative input based on a reward score; and
   generate an output for each positive input consistent with each example.

4. The system of claim 3, wherein the reward score is based on a code similarity metric or a tree edit distance function.

5. The system of claim 1, wherein the one or more programs include further instructions that:
   obtain the additional inputs from the text document from explicit feedback from a user.

6. The system of claim 3, wherein the one or more programs include further instructions that:
   synthesize a new program transformation when an output is produced on a positive input from at least one example.

7. The system of claim 1, wherein the text document includes a source code program, a spreadsheet, an email document, or text file.

8. A computer-implemented method, comprising:
   training a synthesis procedure to learn a program transformation, during an edit session of a text document, from a semi-supervised dataset of feedback derived implicitly from user behavior during the edit session without explicit user feedback, wherein the program transformation is a rule that represents edits when made to an input produces a semantically-equivalent output, the text document represented as a syntax tree having one or more subtrees, the semi-supervised dataset including examples and additional inputs, the examples derived from repetitive edits to an expression in a similar context, the additional inputs inferred from the text document, the program transformation including an input subtree, an output subtree, and one or more rewrite rules that represent edits made on the input subtree to produce the output subtree; and
   utilizing the program transformation during the edit session, to generate a code edit suggestion to an expression in the text document, wherein the input subtree of the program transformation matches the expression.

9. The computer-implemented method of claim 8, further comprising:
   obtaining the additional inputs from one or more subtrees representing an expression at a cursor position.

10. The computer-implemented method of claim 8, further comprising:

obtaining the additional inputs from all subtrees of the syntax tree of the text document.

11. The computer-implemented method of claim 8, further comprising:
classifying an additional input as a positive input or a negative input; and
when the additional input is classified as a positive input, generating a new example for the positive input that is consistent with the examples.

12. The computer-implemented method of claim 11, wherein classifying the additional input as a positive input further comprises:
generating a reward score for the additional input based on a code similarity metric or tree edit distance function using the additional input and the examples; and
designating the additional input as a positive input when the reward score indicates a strong similarity between the additional input and the examples and designating the additional input as a negative input when the reward score indicates a low similarity between the additional input and the examples.

13. The computer-implemented method of claim 8, further comprising:
obtaining the additional inputs from user-directed feedback to expressions in the text document during the edit session.

14. The computer-implemented method of claim 8, wherein the text document includes a source code program, a spreadsheet, an email document, or text file.

15. A device, comprising:
at least one processor and a memory;
wherein the at least one processor is configured to:
represent a text document in an edit session as a syntax tree, the syntax tree having one or more subtrees;
learn program transformations during the edit session from supervised examples and unsupervised additional input obtained implicitly from user behavior during the edit session, a program transformation including a pair (Pguard, Ptrans), wherein Pguard includes a location expression to find subtrees of the syntax tree that match the location expression, wherein Ptrans includes operations applied to matching locations of an input subtree that generate the program transformation; and
generate a code edit suggestion for an expression at a cursor position when a subtree representing the expression matches an input subtree of a select one of the program transformations, the code edit suggestion generated by application of operations of Ptrans of the select one of the program transformations.

16. The device of claim 15, wherein the at least one processor is further configured to:
associate one or more examples with a program transformation; and
obtain a first one of the one or more examples from repetitive edits made to a similar context during the edit session.

17. The device of claim 16, wherein the at least one processor is further configured to:
add additional examples to the one or more examples from additional inputs derived from implicit feedback, when an output is produced for an additional input that is consistent with existing examples.

18. The device of claim 17, wherein the at least one processor is further configured to:
filter the additional inputs based on a reward score into a positive input or a negative input, the reward score based on a code similarity metric or tree edit distance function between a subtree representing an additional input and a subtree representing an existing example.

19. The device of claim 18, wherein the at least one processor is further configured to:
generate an output for the additional input designated as a positive input using the existing examples, positive inputs and negative inputs.

* * * * *